United States Patent
Hutchison et al.

(10) Patent No.: US 10,503,426 B2
(45) Date of Patent: Dec. 10, 2019

(54) EFFICIENT SPACE ALLOCATION IN GATHERED-WRITE BACKEND CHANGE VOLUMES

(71) Applicant: International Business Machines Corporation, Armonk, NY (US)

(72) Inventors: Gordon D. Hutchison, Eastleigh (GB); Miles Mulholland, Chandlers Ford (GB); Lee J. Sanders, Chichester (GB); Ben Sasson, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/647,262

(22) Filed: Jul. 12, 2017

(65) Prior Publication Data
US 2019/0018593 A1    Jan. 17, 2019

(51) Int. Cl.
*G06F 3/06* (2006.01)

(52) U.S. Cl.
CPC .............. *G06F 3/065* (2013.01); *G06F 3/067* (2013.01); *G06F 3/0608* (2013.01); *G06F 3/0617* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,108,640 B1 * | 1/2012 | Holl, II | ............... | G06F 11/1458 711/162 |
| 8,145,605 B2 * | 3/2012 | Nakamura | ............ | G06F 17/302 707/649 |
| 8,566,286 B1 * | 10/2013 | Hawton | ............... | G06F 11/1402 707/654 |
| 8,806,062 B1 * | 8/2014 | Vertongen | ......... | H04L 29/08783 709/247 |
| 9,081,792 B1 * | 7/2015 | Williams | ............. | G06F 11/1453 |
| 9,171,052 B2 * | 10/2015 | Modukuri | ............. | G06F 3/0665 |

(Continued)

OTHER PUBLICATIONS

IBM zOS Global Mirror Planning-Operations-and Best Practice-Bertrand Dufrasne-Werner Bauer-Shu Xie-Roland Wolf-IBM-Redbooks-2013 (Year: 2013).*

(Continued)

*Primary Examiner* — Khoa D Doan
(74) *Attorney, Agent, or Firm* — Nelson and Nelson; Daniel P. Nelson; Alexis V. Nelson (57) ABSTRACT

A method for replicating data from a primary site to a secondary site is disclosed. In one embodiment, such a method includes tracking, at a primary site, updates to storage elements of a primary volume over a specified period of time. The method further calculates a size associated with the updates and communicates the size from the primary site to a secondary site. At the secondary site, using the size received from the primary site, the method determines an amount of storage space required to accommodate the updates in a secondary volume. In certain embodiments, this may include taking into account compression or deduplication algorithms at the secondary site. The method allocates the storage space to the secondary volume and replicates, from the primary site to the secondary site, the updates to the secondary volume. A corresponding system and computer program product are also disclosed.

20 Claims, 6 Drawing Sheets

(56) References Cited

U.S. PATENT DOCUMENTS

| | | | |
|---|---|---|---|
| 9,251,198 B2* | 2/2016 | Mutalik | G06F 17/30162 |
| 9,323,764 B2 | 4/2016 | Goodman et al. | |
| 9,383,924 B1 | 7/2016 | Fullbright et al. | |
| 9,489,133 B2* | 11/2016 | Haustein | G06F 3/0605 |
| 9,626,249 B1* | 4/2017 | Bushman | G06F 11/1448 |
| 9,804,778 B2* | 10/2017 | Gensler, Jr. | G06F 3/0604 |
| 10,157,006 B1* | 12/2018 | Armangau | G06F 3/065 |
| 10,200,470 B1* | 2/2019 | Chakraborty | H04L 67/1095 |
| 2004/0215755 A1* | 10/2004 | O'Neill | G06F 8/654 |
| | | | 709/223 |
| 2007/0233987 A1* | 10/2007 | Maruyama | G06F 3/0605 |
| | | | 711/165 |
| 2008/0082777 A1* | 4/2008 | Sakaguchi | G06F 3/0605 |
| | | | 711/170 |
| 2009/0228671 A1* | 9/2009 | Shigemura | G06F 11/1466 |
| | | | 711/162 |
| 2010/0281228 A1* | 11/2010 | Wade | G06F 11/1451 |
| | | | 711/162 |
| 2010/0306412 A1* | 12/2010 | Therrien | H03M 7/3084 |
| | | | 709/247 |
| 2011/0099351 A1* | 4/2011 | Condict | G06F 3/0608 |
| | | | 711/216 |
| 2012/0036325 A1* | 2/2012 | Mashtizadeh | G06F 12/0802 |
| | | | 711/118 |
| 2013/0282998 A1* | 10/2013 | Tatsumi | G06F 11/1456 |
| | | | 711/162 |
| 2014/0114932 A1* | 4/2014 | Mallaiah | G06F 3/0608 |
| | | | 707/692 |
| 2014/0215173 A1* | 7/2014 | Clark | G06F 12/16 |
| | | | 711/162 |
| 2014/0281168 A1* | 9/2014 | Koseki | G06F 11/108 |
| | | | 711/103 |
| 2014/0372696 A1* | 12/2014 | Tune | G06F 12/0846 |
| | | | 711/114 |
| 2016/0048431 A1* | 2/2016 | Modukuri | G06F 3/0665 |
| | | | 707/676 |
| 2016/0224244 A1* | 8/2016 | Gensler, Jr. | G06F 3/0604 |
| 2018/0052621 A1* | 2/2018 | Diel | G06F 3/067 |

OTHER PUBLICATIONS

"HP LeftHand P4000 SANs," Hewlett-Packard Development Company, L.P, Apr. 2009, available at http://www.tycom.co.uk/files/brochure.pdf.

* cited by examiner

EFFICIENT SPACE ALLOCATION IN GATHERED-WRITE BACKEND CHANGE VOLUMES

BACKGROUND

Field of the Invention

This invention relates to systems and methods for replicating data from a primary site to a secondary site.

Background of the Invention

In IBM SAN Volume Controller (SVC) Global Mirror, data is asynchronously mirrored from a primary storage system to a secondary storage system in order to maintain two consistent copies of data. The primary and secondary storage systems may be located at different sites, perhaps hundreds or thousands of miles away from one another. In the event the primary storage system fails, I/O may be redirected to the secondary storage system, thereby enabling continuous operations.

One variant of SVC Global Mirror is IBM Global Mirror with Change Volumes, often abbreviated as GMCV. GMCV provides some important benefits and differences compared to conventional Global Mirror. Specifically, GMCV isolates link bandwidth use from host write performance, and automatically restarts after a loss of connectivity is restored. These two benefits make this type of Global Mirror self-managing, while being impacted less by specific host workload. GMCV uses two key steps to replicate data: a capture step, and a copy step. The capture step captures updates to a production volume, located at a primary site, onto a change volume. During this step, a host system may read and write in an unrestricted manner to the production volume. The copy step, by contrast, copies the updates from the change volume to a secondary volume located at a secondary site. Because data is copied from the change volume to the secondary volume as opposed to directly from the production volume to the secondary volume, I/O workload associated with the asynchronous data replication is relieved from the production volume. After changes are copied from the change volume to the secondary volume, the contents of the secondary volume may be captured on a change volume at the secondary site.

In view of the foregoing, systems and methods are needed to improve the efficiency of asynchronous data replication systems such as GMCV.

SUMMARY

The invention has been developed in response to the present state of the art and, in particular, in response to the problems and needs in the art that have not yet been fully solved by currently available systems and methods. Accordingly, the invention has been developed to provide systems and methods to more efficiently replicate data from a primary site to a secondary site. The features and advantages of the invention will become more fully apparent from the following description and appended claims, or may be learned by practice of the invention as set forth hereinafter.

Consistent with the foregoing, a method for replicating data from a primary site to a secondary site is disclosed. In one embodiment, such a method includes tracking, at a primary site, updates to storage elements of a primary volume over a specified period of time. The method further calculates a size associated with the updates and communicates the size from the primary site to a secondary site. At the secondary site, using the size received from the primary site, the method determines an amount of storage space required to accommodate the updates in a secondary volume. In certain embodiments, this may include taking into account compression or deduplication algorithms at the secondary site. The method allocates the storage space to the secondary volume and replicates, from the primary site to the secondary site, the updates to the secondary volume.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
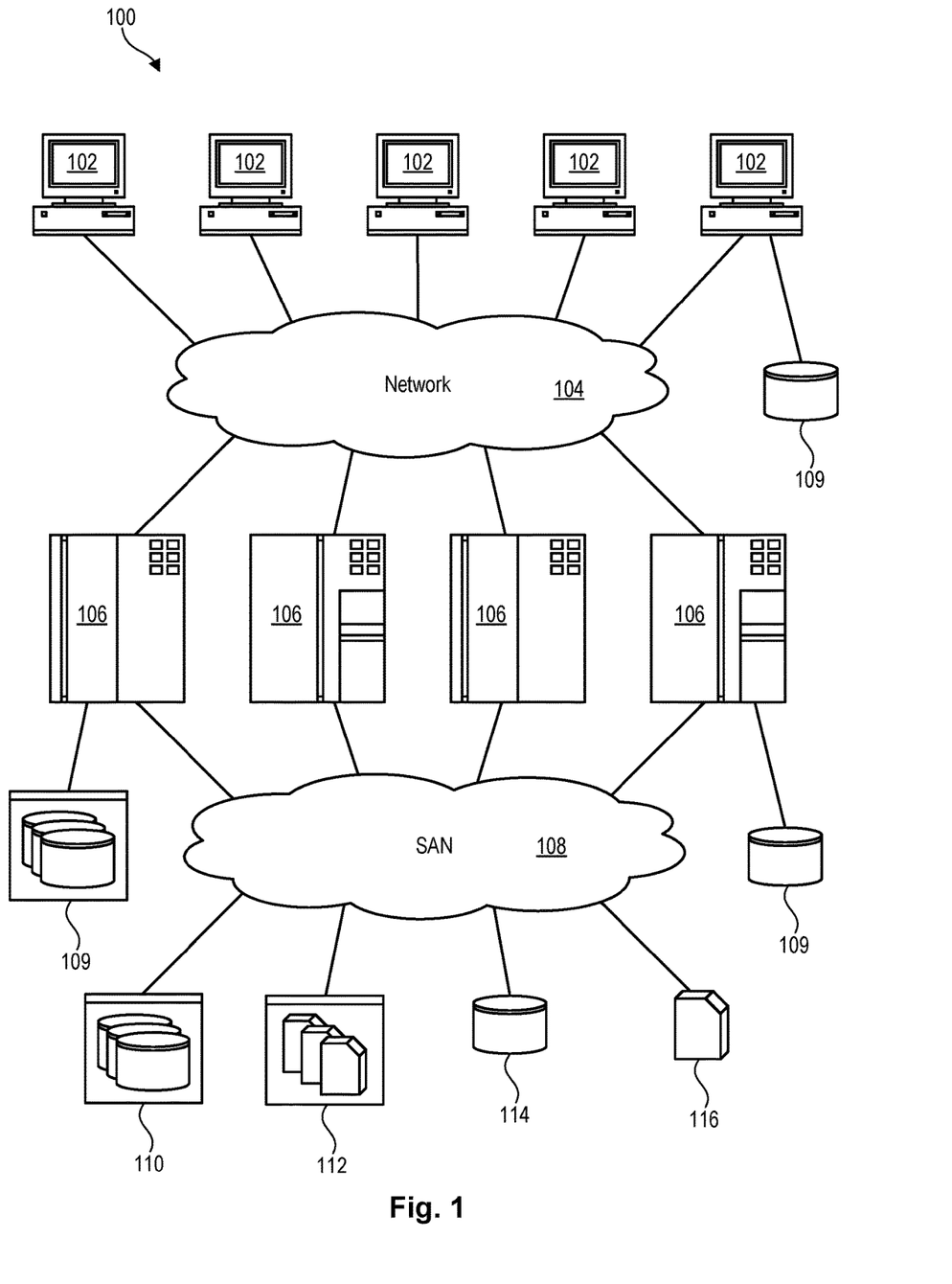
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment in which systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
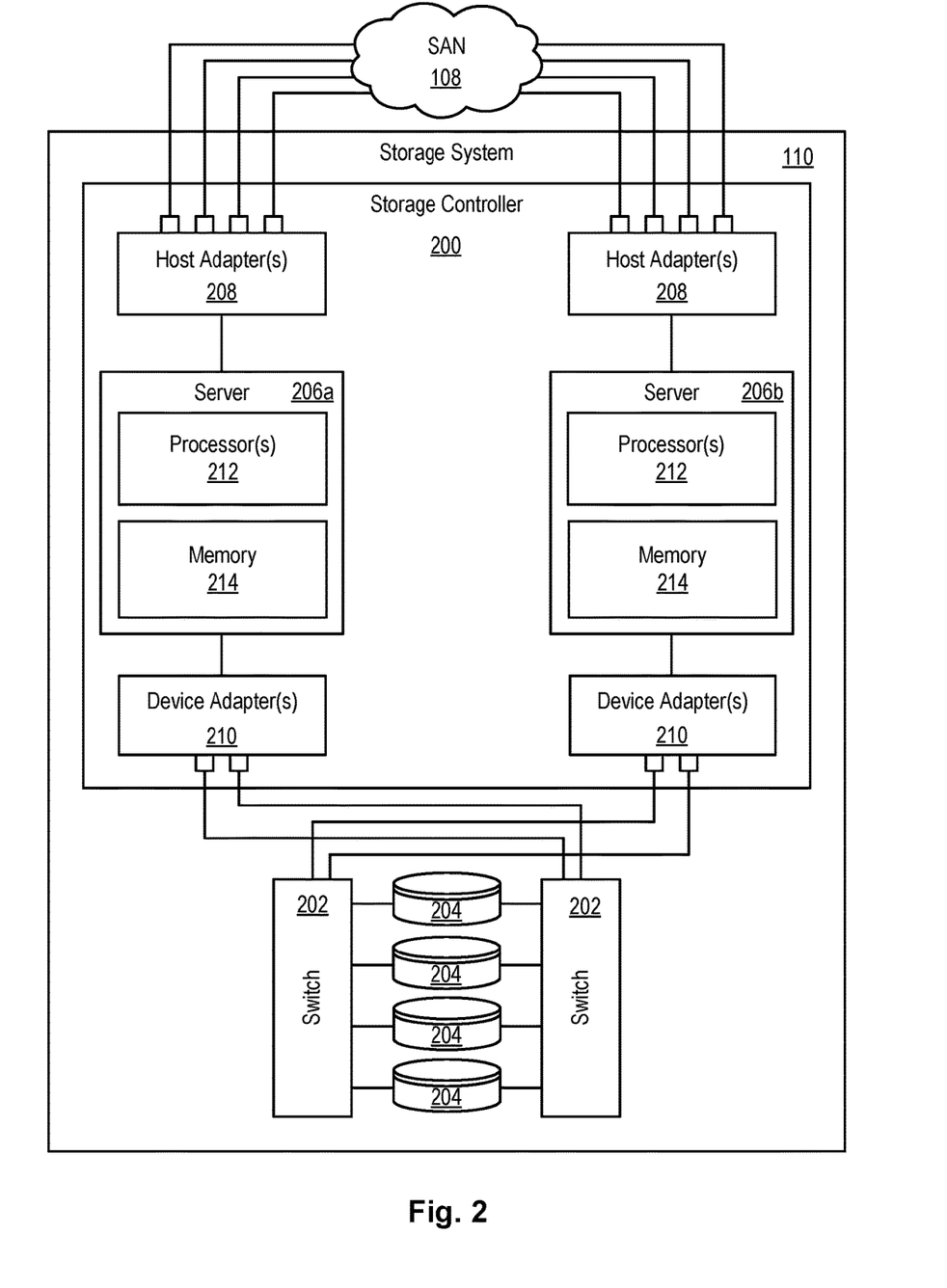
FIG. 2 is a high-level block diagram showing one example of a storage system that may function as a primary or secondary storage system in an asynchronous data replication system.
Figure 3:
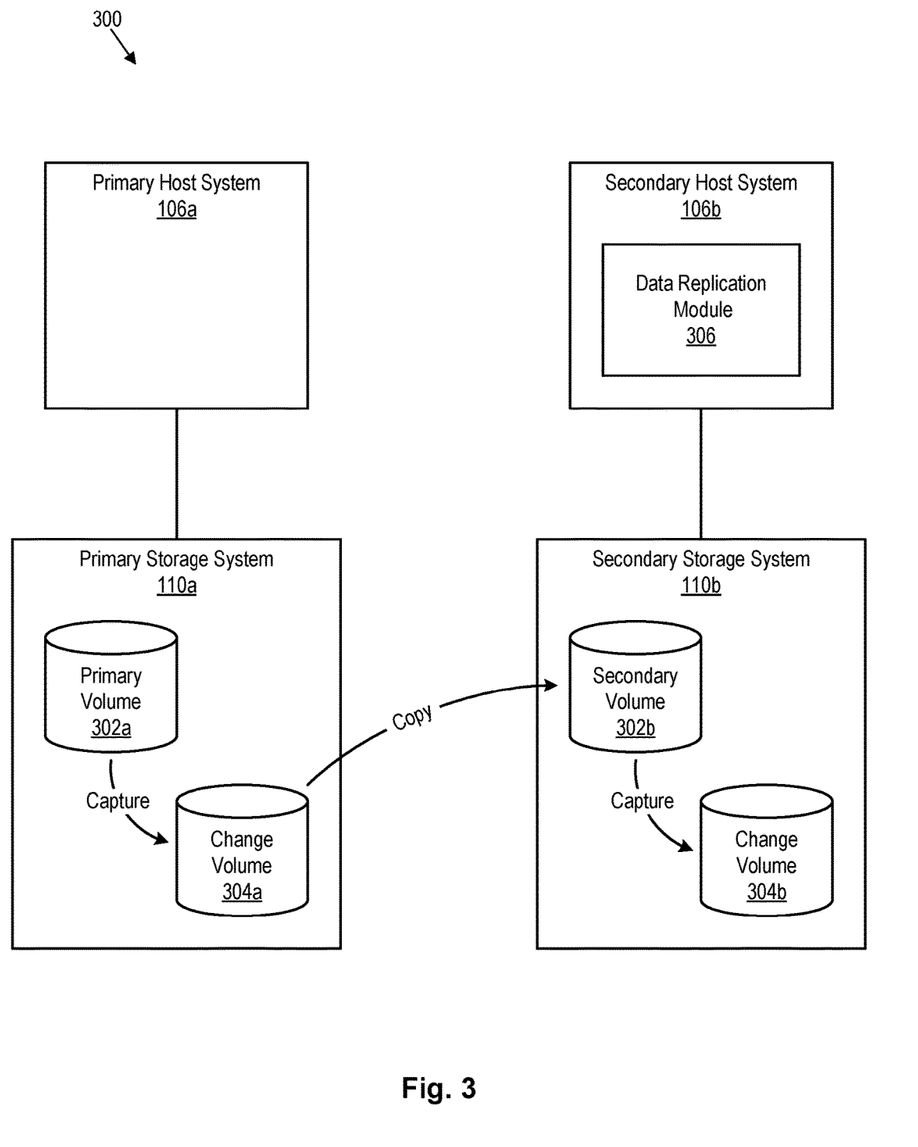
FIG. 3 is a high-level block diagram showing how an asynchronous data replication system may use change volumes to asynchronously mirror data from a primary site to a secondary site.

Referring to FIG. 2, one embodiment of a storage system 110 containing an array of hard-disk drives 204 and/or solid-state drives 204 is illustrated. Such a storage system 110 may function as a primary or secondary storage system in an asynchronous data replication system 300 (as shown in FIG. 3). As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Referring to FIG. 3, as previously mentioned, in SVC Global Mirror (also referred to as "XRC" on the IBM DS8000™ enterprise storage system), a data replication module 306 (also known as System Data Mover, or SDM, in the z/OS environment) may asynchronously mirror data from primary volumes 302a on a primary storage system 110a to secondary volumes 302b on a secondary storage system 110b in order to maintain two consistent copies of data. The primary and secondary storage systems 110a, 110b may be located at different sites, perhaps hundreds or even thousands of miles away from one another. In the event the primary storage system 110a fails, I/O may be redirected to the secondary storage system 110b, thereby enabling continuous operations. In a failover situation, the secondary storage system 110b may act as the primary storage system 110a and the primary storage system 110a may act as the secondary storage system 110b.

One variant of SVC Global Mirror is IBM Global Mirror with Change Volumes (GMCV). An example of this variant is shown in FIG. 3. GMCV provides some important benefits and differences compared to conventional Global Mirror. Specifically, GMCV isolates link bandwidth use from host write performance, and automatically restarts after a loss of connectivity is restored. These two benefits make this type of Global Mirror self-managing, while being impacted less by specific host workload.

In GMCV, the data replication module 306 uses two key steps to replicate data: a capture step, and a copy step. The capture step captures updates made to a production volume 302a over a specified period of time to a change volume 304a located at the same primary site. The capture step may be thought of as creating an incremental point-in-time copy 302 of data in the primary volume 302a within the change volume 304a. During the capture step, a host system 106a may read and write to the production volume 302a in an unrestricted manner. The copy step, by contrast, copies the updates from the change volume 304a to a secondary volume 302b located at a secondary site. Because data is copied from the change volume 304a to the secondary volume 302b as opposed to directly from the primary volume 302a to the secondary volume 302b, significant data replication workload may be relieved from the production volume 302. After changes are copied from the change volume 304a to the secondary volume 302b, the contents of the secondary volume 302b may be captured on a change volume 304b at the secondary site.

The capture and copy steps (collectively referred to herein as a "cycle") may repeat to ensure that updates to the primary volume 302a continue to be replicated to the secondary volume 302b. Each time the copy step completes (or, in certain embodiments, in response to expiration of a timer, such as every five minutes), a new capture step may be triggered. When the copy step is in process, an incremental bitmap may keep track of storage elements (e.g., tracks, etc.) of the primary volume 302a that have been updated since the contents of the primary volume 302a were last captured in the change volume 304a. When the capture step is triggered (initiating a new cycle), storage elements having their bits set in the incremental bitmap may have their data captured in the change volume 304a. This data may then be copied from the change volume 304a to the secondary volume 302b during the copy step. The data that is copied from the change volume 304a to the secondary volume 302b during one cycle is referred to herein as a "change set."

Figure 4:
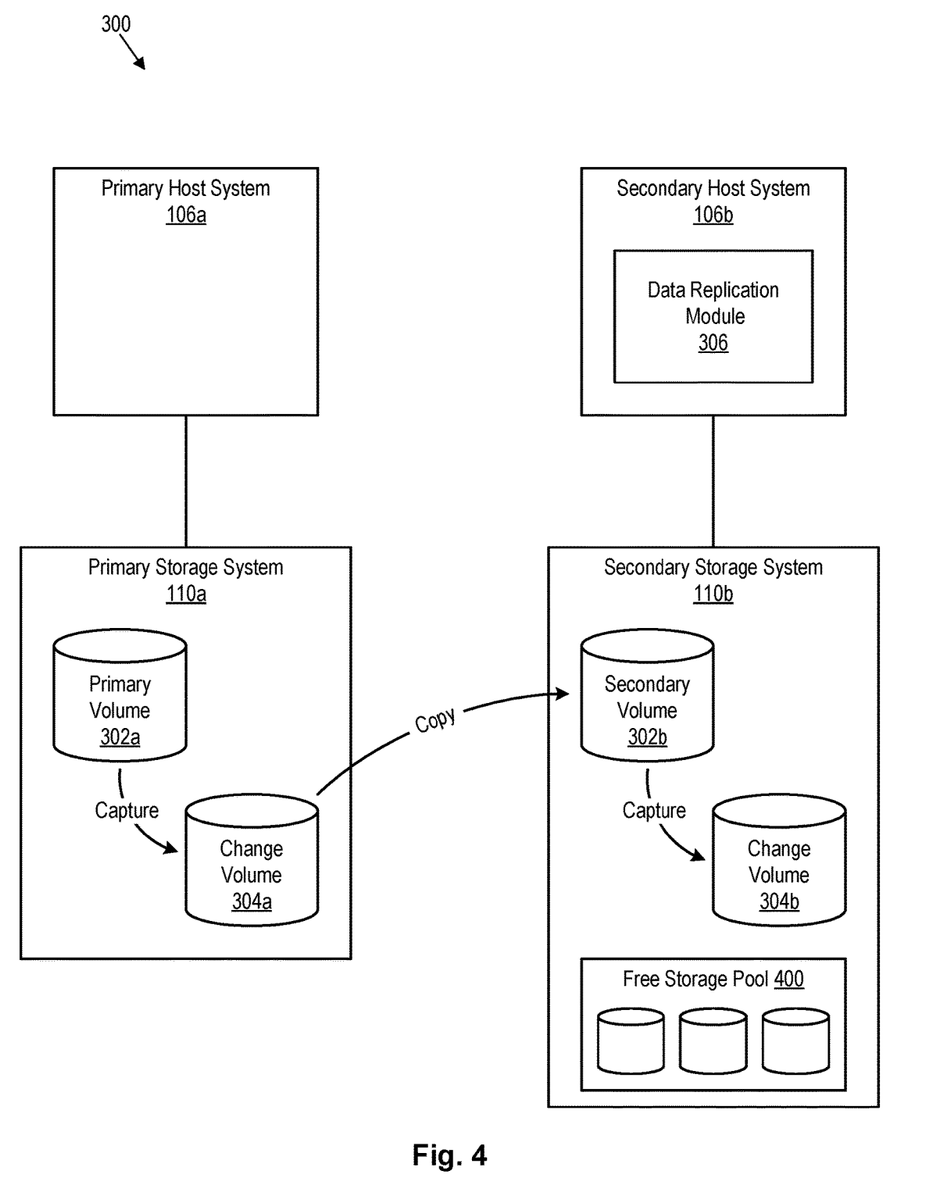
FIG. 4 is a high-level block diagram showing how storage space may be allocated on demand to a secondary volume at the secondary site.

Referring to FIG. 4, in certain embodiments, space may be allocated to a secondary volume 302b on an as-need basis to efficiently allocate storage space on the secondary storage system 110b. In certain embodiments, the secondary volume is a thin-provisioned, compressed, and/or deduplicated volume that is allocated storage space from a free storage pool 400 when data storage needs require. When storage space is no longer needed, the storage space may be returned to the free storage pool 400 so that it can be allocated to other thin-provisioned volumes on the secondary storage system 110b. A free storage pool 400 represents just one way of managing free storage space and is not intended to represent the only way that the secondary storage system 110b may manage free storage space.

Figure 5:
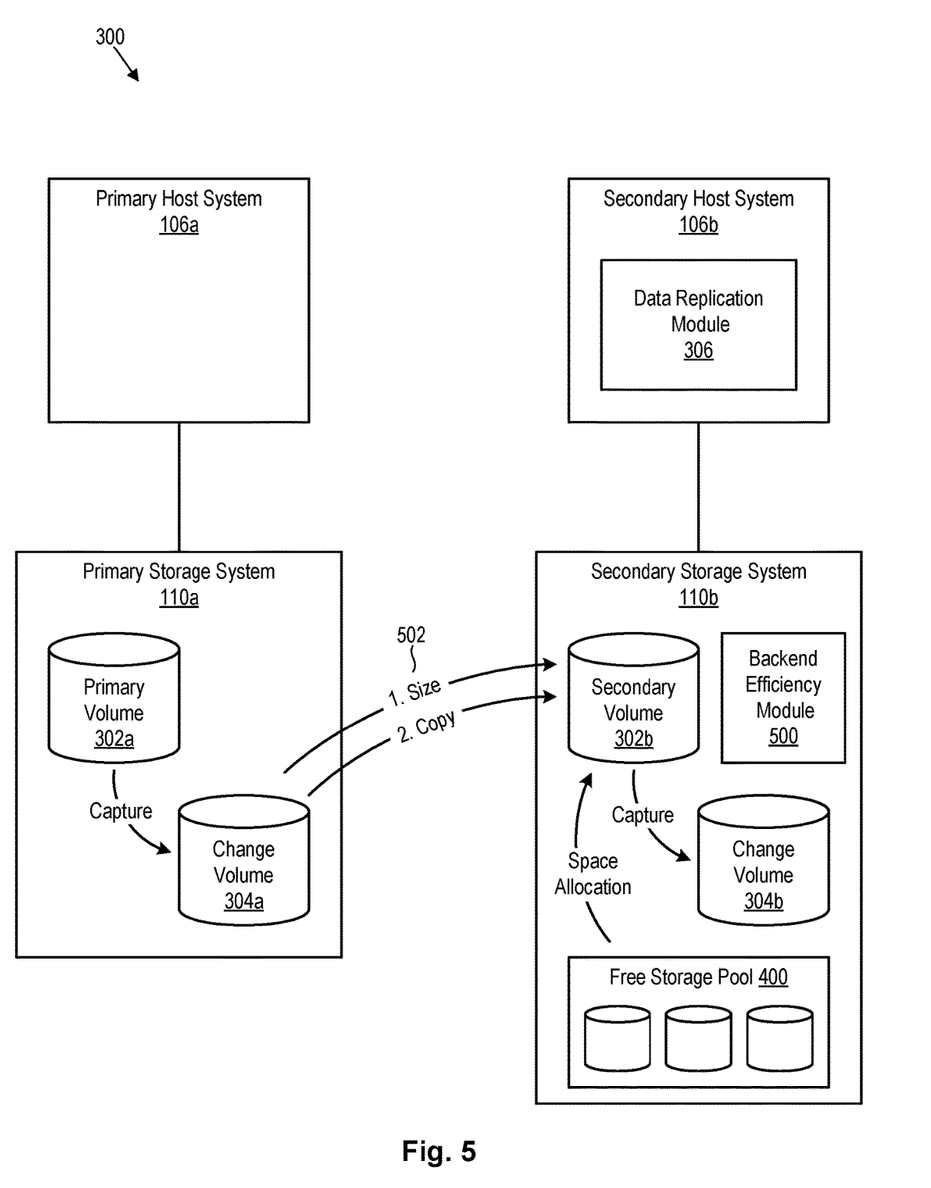
FIG. 5 is a high-level block diagram showing how a backend efficiency module may be used to more efficiently allocate storage space to the secondary volume at the secondary site.

Referring to FIG. 5, as data is copied from the change volume 304a to the secondary volume 302b, a backend efficiency module 500 in accordance with the invention may be configured to ensure that storage space is allocated to the secondary volume 302b in an efficient manner. Because a link between a primary storage system 110a and a secondary storage system 110b may, in certain cases, have a difficult time keeping up with updates to the primary volume 302a, any efficiency improvements at the backend storage system 110b may be beneficial to ensure that the link operates as efficiently as possible. For example, the backend efficiency module 500 may ensure that storage space is allocated to the secondary volume 302b in a large enough chunk to accommodate a change set, but not so large to inefficiently utilize storage space. Ideally, the storage space that is allocated to the secondary volume 302b will be as contiguous as possible on the underlying storage media (hard disk drives 204, etc.). This will improve the efficiency of writing to the backend storage volume 302b, which may use a "gathered writes" technique wherein writes are gathered together and sequentially written to the backend storage volume 302b with an advancing write cursor or edge.

In order to improve the efficiency of writing a change set to a backend storage volume 302b, the primary storage system 110a may be configured to calculate the size of a change set and send this size 502 to the secondary storage system 110b prior to transmitting the change set thereto. This will enable the secondary storage system 110b to allocate enough storage space to the secondary volume 302b to accommodate the change set. The size 502 that is transmitted may be represented as a number of storage elements (e.g., tracks) making up the change set or a size in bytes or other units indicating the size of data within the change set. In certain embodiments, the size 502 may be calculated by incrementing a counter each time a bit in the incremental bitmap is changed from zero to one (i.e., indicating that a storage element has been updated). This counter value may be sent directly to the secondary storage system 110b or the counter value may be multiplied by the storage element size and then sent to the secondary storage system 110b.

When the size 502 is received by the secondary storage system 110b, the backend efficiency module 500 may use the size 502 to determine how much storage space should be allocated to the secondary volume 302b. In making this determination, the backend efficiency module 500 may take into account compression or deduplication rates on the secondary volume 302b. Because the secondary volume 302b is a backend storage volume 302b, data compression and deduplication may be used to more efficiently utilize storage space on the secondary storage system 110b. As a result, storage space needed to accommodate data associated with a change set may be smaller than the size 502 received from the primary storage system 110a. Thus, the backend efficiency module 500 may, in certain embodiments, take into account historical data compression and deduplication rates when determining how much storage space to allocate to the secondary volume 302b to accommodate a change set.

Figure 6:
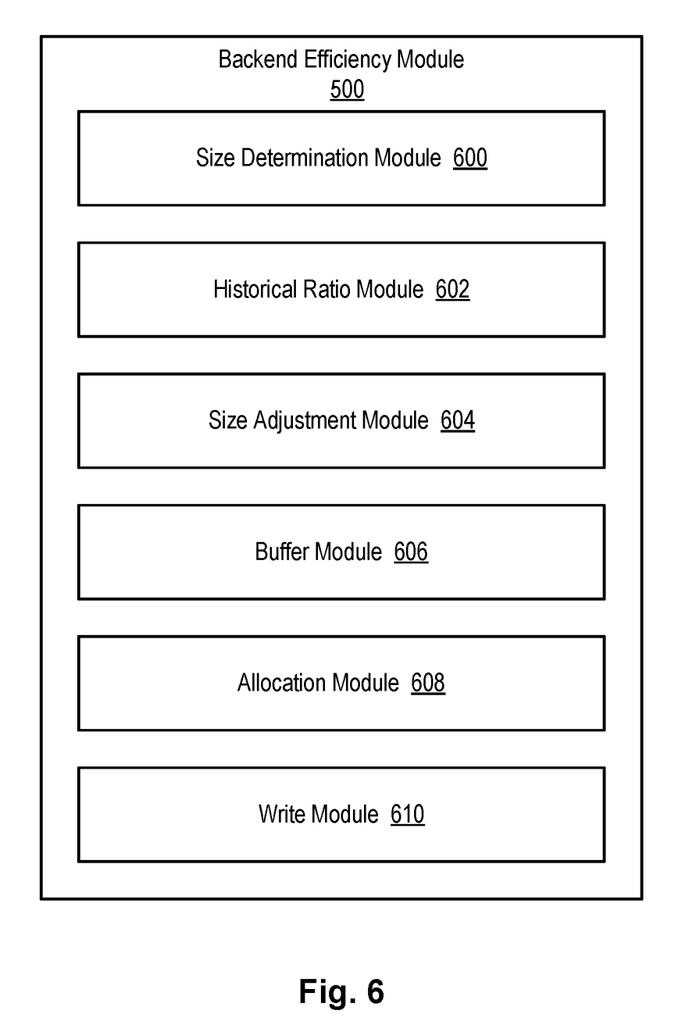
FIG. 6 is a high-level block diagram showing various sub-modules that may be included within or in association with the backend efficiency module.

Referring to FIG. 6, the backend efficiency module 500 discussed in association with FIG. 5 may include various sub-modules to provide various features and functions. These sub-modules, like the backend efficiency module 500 itself, may be implemented in hardware, software, firmware or combinations thereof. The sub-modules are presented by way of example and not limitation. The backend efficiency module 500 may, in certain embodiments, include more or fewer sub-modules than those illustrated. Similarly, the functionality of the sub-modules may, in certain embodiments, be combined into a single or smaller number of sub-modules or the functionality of a single sub-module may be distributed across several sub-modules. The illustrated sub-modules are not necessarily located in the backend efficiency module 500 and may, in certain embodiments, be implemented as separate modules or in different locations than the backend efficiency module 500.

As shown, the backend efficiency module 500 may include one or more of a size determination module 600, historical ratio module 602, size adjustment module 604, buffer module 606, allocation module 608, and write module 610. The size determination module 600 may determine the size of a change set. In certain embodiments, this is accomplished by determining a number of storage elements in the change set or calculating a size in terms of bytes of other units of data associated with a change set. In certain embodiments, the size determination module 600, as opposed to determining the size, receives the size from the primary storage system 110a, which calculates the size.

The historical ratio module 602 may estimate how much storage space is required to store a change set of a particular size 502. For example, if data compression or deduplication is used on the secondary volume 302b, the historical ratio module 602 may determine the ratio of storage space that was required to store a change set, relative to the original size 502 of the change set. In certain embodiments, this may be accomplished by analyzing or maintaining historical records regarding the size 502 of change sets that are received, and the amount of storage space that was needed to actually store the change sets after compression and/or deduplication.

Once the historical ratio module 602 calculates how much storage space is required to store a change set of a particular size 502, the size adjustment module 604 may adjust an allocation amount accordingly. For example, the size adjustment module 604 may adjust an allocated amount of storage space to be some percentage (e.g., 50%, 80%, etc.) of the size 502 of the change set. In certain embodiments, a buffer module 606 may build some buffer into the allocation amount to prevent under allocation of storage space for the change set. For example, the buffer module 606 may add five percent to the calculated allocation amount to help ensure that the secondary volume 302b does not run out of storage space when writing the change set thereto.

Once an amount of storage space needed to accommodate a change set is determined, the allocation module 608 may allocate the storage space to the secondary volume 302b. In certain embodiments, the allocation module 608 may adjust the allocation to take into account free space already present in the secondary volume 302b. Once the storage space is allocated, the write module 610 may write the change set to the secondary volume 302b. In certain embodiments, this may occur using a "gathered writes" or other similar approach. If more storage space is needed during the write process, the allocation module 608 may allocate more storage space to the secondary volume 302b.

The disclosed systems and methods are advantageous in that they enable the secondary storage system 110b to better manage free space. More specifically, by allocating storage space in an amount that corresponds to what is needed to accommodate a change set, the disclosed systems and methods may reduce locking in shared data structures, reduce free-space over-allocation to the secondary volume 302*b*, reduce code paths (e.g., allocation requests, etc.) used as data arrives at the secondary storage system 110*b*, and potentially provide free space that is more contiguous for the data being written. This results in a more efficient system that may benefit volumes, even non-gathered-write volumes, that share a common pool of free space.

As previously mentioned, a backend storage volume 302*b* may use a "gathered writes" technique wherein writes are gathered together and sequentially written to a backend storage volume 302*b* with an advancing write cursor or edge. Using this technique, data that is written to logical random locations is written sequentially to physical storage space of a volume. This typically requires contiguous storage space on the volume. A directory may be utilized to map the virtual (i.e., logical) to physical location of the data. When data is compressed and a logical address is overwritten, a new version of the data may be relocated elsewhere on the physical storage medium and the directory updated. This means that the physical storage medium may contain old versions of the data. Over time, some fragmentation of the physical storage medium may occur. In such cases, some form of garbage collection may be used to gather old data and defragment physical storage space to create larger contiguous regions. Embodiments of the invention may, in certain embodiments, coordinate with garbage collection processes by notifying the garbage collection processes of an amount of storage space that may be needed to accommodate a change set.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for replicating data from a primary site to a secondary site, the method comprising:
    tracking, by a primary storage system at a primary site, updates to storage elements of a primary volume over a specified period of time;
    capturing the updates in a change volume located on the primary storage system;
    calculating, by the primary storage system, a size associated with the updates;
    communicating, by the primary storage system, the size to a secondary storage system at a secondary site;
    adjusting, by the secondary storage system, the size to account for data-size reduction that occurs on the secondary storage system; and
    allocating, by the secondary storage system within a secondary volume, an amount of storage space needed to accommodate the updates in view of the adjusted size and then replicating the updates from the change volume to the secondary volume.

2. The method of claim 1, wherein the data-size reduction is achieved using data compression.

3. The method of claim 1, wherein adjusting the size comprises taking into account historical compression rates when adjusting the size.

4. The method of claim 1, wherein the data-size reduction is achieved using data deduplication.

5. The method of claim 1, wherein adjusting the size comprises taking into account historical deduplication rates when adjusting the size.

6. The method of claim 1, wherein replicating the updates to the secondary volume comprises using a "gathered writes" technique to write the updates to the secondary volume.

7. The method of claim 1, wherein the secondary volume is a thin-provisioned volume.

8. A computer program product for replicating data from a primary site to a secondary site, the computer program product comprising a non-transitory computer-readable storage medium having computer-usable program code embodied therein, the computer-usable program code configured to perform the following when executed by at least one processor:
    track, by a primary storage system at a primary site, updates to storage elements of a primary volume over a specified period of time;
    capture the updates in a change volume located on the primary storage system;
    calculate, by the primary storage system, a size associated with the updates;
    communicate, by the primary storage system, the size to a secondary storage system at a secondary site;
    adjust, by the secondary storage system, the size to account for data-size reduction that occurs on the secondary storage system; and
    allocate, by the secondary storage system within a secondary volume, an amount of storage space needed to accommodate the updates in view of the adjusted size and then replicate the updates from the change volume to the secondary volume.

9. The computer program product of claim 8, wherein the data-size reduction is achieved using data compression.

10. The computer program product of claim 8, wherein adjusting the size comprises taking into account historical compression rates when adjusting the size.

11. The computer program product of claim 8, wherein the data-size reduction is achieved using data deduplication.

12. The computer program product of claim 8, wherein adjusting the size comprises taking into account historical deduplication rates when adjusting the size.

13. The computer program product of claim 8, wherein replicating the updates to the secondary volume comprises using a "gathered writes" technique to write the updates to the secondary volume.

14. The computer program product of claim 8, wherein the secondary volume is a thin-provisioned volume.

15. A system for replicating data from a primary site to a secondary site, the system comprising:
    at least one processor;
    at least one memory device operably coupled to the at least one processor and storing instructions for execution on the at least one processor, the instructions causing the at least one processor to:

track, by a primary storage system at a primary site, updates to storage elements of a primary volume over a specified period of time;

capturing the updates in a change volume located on the primary storage system;

calculate, by the primary storage system, a size associated with the updates;

communicate, by the primary storage system, the size to a secondary storage system at a secondary site;

adjust, by the secondary storage system, the size to account for data-size reduction that occurs on the secondary storage system; and allocate, by the secondary storage system within a secondary volume, an amount of storage space needed to accommodate the updates in view of the adjusted size and then replicate the updates from the change volume to the secondary volume.

16. The system of claim 15, wherein the data-size reduction is achieved using data compression.

17. The system of claim 15, wherein adjusting the size comprises taking into account historical compression rates when adjusting the size.

18. The system of claim 15, wherein the data-size reduction is achieved using data deduplication.

19. The system of claim 15, wherein adjusting the size comprises taking into account historical deduplication rates when adjusting the size.

20. The system of claim 15, wherein replicating the updates to the secondary volume comprises using a "gathered writes" technique to write the updates to the secondary volume.

* * * * *